United States Patent [19]

Austin

[11] Patent Number: 4,869,059
[45] Date of Patent: Sep. 26, 1989

[54] YARN CONSOLIDATION BY WRAPPING FOR HOLLOW FIBER MEMBRANES

[75] Inventor: Jane E. Austin, Elkton, Md.

[73] Assignee: E. I. Du Pont de Nemours and Company, Wilmington, Del.

[21] Appl. No.: 181,914

[22] Filed: Apr. 29, 1988

[51] Int. Cl.$^4$ .................. D02G 3/00; D02G 3/44; D01D 5/24

[52] U.S. Cl. .................. 57/210; 57/243; 57/248; 57/6; 57/18

[58] Field of Search .......... 57/3, 6, 7, 18, 13, 57/210, 76, 77, 230, 243, 244, 248, 229; 428/377, 378, 398; 242/DIG. 3, 82, 18 DD

[56] References Cited

U.S. PATENT DOCUMENTS

| | | | |
|---|---|---|---|
| 3,478,399 | 11/1969 | Wyatt | 242/82 X |
| 3,690,465 | 9/1972 | McGinnis et al. | 210/321 |
| 3,801,401 | 4/1974 | Cope et al. | 156/172 |
| 4,018,042 | 4/1977 | Maag et al. | 57/18 X |
| 4,028,874 | 6/1977 | Maag et al. | 57/18 X |
| 4,299,884 | 11/1981 | Payer | 57/210 X |
| 4,342,711 | 8/1982 | Joh et al. | 428/398 X |
| 4,346,553 | 8/1982 | Schwartz | 57/210 |
| 4,548,866 | 10/1985 | Cordova et al. | 428/398 |
| 4,559,884 | 12/1985 | Stöldt et al. | 112/262.1 |

Primary Examiner—Donald Watkins
Attorney, Agent, or Firm—Frank C. Hilberg, Jr.

[57] ABSTRACT

Hollow fiber separation membranes are bundled in groups of 5–350 membranes and helically wound with a 20–120 denier yarn. The bundle is more readily handled when making permeators using dry membranes and there is significantly reduced fiber breakage and damage.

16 Claims, 1 Drawing Sheet

YARN CONSOLIDATION BY WRAPPING FOR HOLLOW FIBER MEMBRANES

BACKGROUND OF THE INVENTION

1. Field of the Invention

The present invention relates to a helically-wrapped bundle of hollow fibers suitable for use as separation membranes, and the process for producing such a bundle.

2. Prior Art

U.S. Pat. No. 4,559,884 discloses bundling hollow fibers together with a sewing seam to prevent damage to the fibers.

SUMMARY OF THE INVENTION

The process of the present invention involves helically winding a fine denier yarn or filament around a multifilament bundle of hollow fiber membranes. The fine denier yarn or filament holds the multifiber hollow fiber bundle together in subsequent fiber handling steps. The consolidated hollow fiber bundle is less susceptible to damage in the remaining fiber handling steps. Also, the use of the consolidated hollow fiber bundle results in an increase of the packing density in the permeator containing the hollow fiber membranes. The higher packing density increases the productivity of a permeator.

DETAILED DESCRIPTION

The consolidation of a bundle of hollow fiber membranes in accordance with the present invention by containment with a helical wrap eliminates splaying of the hollow fiber membranes due to static charge or other mechanical forces thus reducing breakage and other damage to the hollow fiber membranes. The easily damaged hollow fiber membranes are rendered less prone to breakage by the helical wrap in the fiber handling steps required to produce permeation modules. As a result of the improvements in the hollow fiber membrane handling steps, permeation modules that exhibit higher selectivity to two components in a fluid stream are produced from the helically-wrapped hollow fiber membranes.

The hollow fiber membranes are prepared by extruding a solution of 15–30 weight percent of a polymer in a suitable solvent. The fibers are extruded through an air gap to permit evaporation of some of the solvent and then quenched in a liquid such as water to freeze in the structure and provide an asymmetric membrane with a thin outer skin supported by a generally cellular structure. The aromatic polyamides are the preferred polymers for making the hollow fiber membranes but other polymeric materials can be used. Other suitable polymers include, but are not limited to polysulfone, polyesters, and polyimides.

Figure 1:
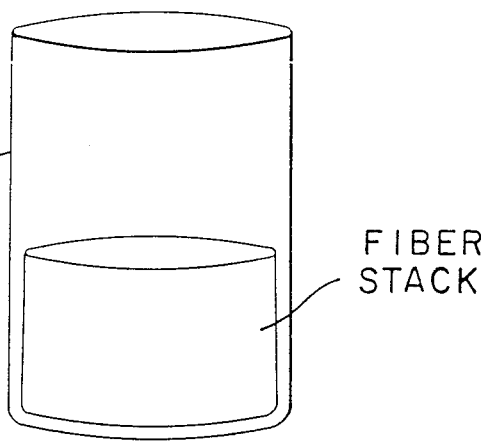
FIG. 1 is a schematic side view of a container (piddle can) used to collect hollow fiber membranes after spinning and quenching.
Figure 2:
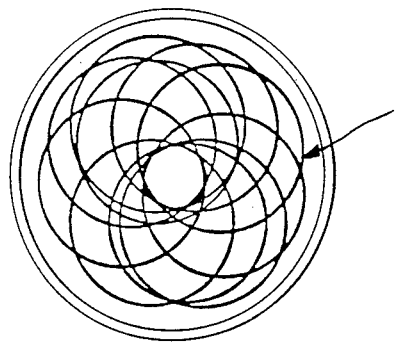
FIG. 2 is a top view of a laydown pattern of the hollow fiber membranes in the container (piddle can).

After the hollow fiber membranes have been spun and quenched, the fibers are then collected in a perforated metal basket called a piddle can, schematically depicted in FIG. 1. The hollow fiber membrane laydown pattern in the piddle can is shown in FIG. 2 which is a top view of the hollow fiber membranes in the piddle can shown in FIG. 1. If the hollow fiber membranes are unrestrained (i.e. unwrapped) they can splay apart in the piddle can and become entangled with other hollow fiber membranes. After the hollow fiber membranes have been washed to remove the remaining solvent and optionally dried, the hollow fiber membranes are wound from the piddle can onto bobbins.

During bobbin winding, the tangled hollow fiber membranes in the piddle can are often broken when they are pulled out of the piddle can. The unrestrained hollow fiber membranes may also splay apart in the bobbin winding process. The hollow fiber membranes for gas separation are dry and do not have a finish on them. Thus, the hollow fiber membranes have a tendency to pick up static electricity and repel each other. The loose hollow fiber membranes are easily damaged and broken when they snag on the guides in the winding process.

During the permeator bundle forming process, using a process similar to that disclosed in U.S. Pat. Nos. 3,690,465 and 3,801,401 a plurality of bobbins are simultaneously wound around a flatly held sheet of nonwoven fabric and the thus wound sheet rolled into bundle form. Again, the unrestrained fibers tend to splay apart during the forming process resulting in membrane damage and broken hollow fiber membranes. With the helical wrap, the hollow fiber membranes are bundled and held closely together. The hollow fiber membrane bundle handles like a consolidated yarn; therefore, hollow fiber membrane damage and breakage during the hollow fiber handling steps are essentially eliminated. As a result of the closer packing of the hollow fiber membranes, the overall permeator packing density is significantly increased with the helically-wrapped hollow fiber membranes. The higher packing density increases the productivity of a permeator.

The present invention can be used to consolidate dry or wet hollow fiber membranes, during bobbin winding, as well as wet hollow fiber membranes during spinning to improve the production and performance of membrane separation modules. The use of the present invention has demonstrated significant and even crucial improvements in bundle performance for gas separation modules. The present invention is also applicable to other hollow fiber membrane systems such as those for reverse osmosis.

Figure 3:
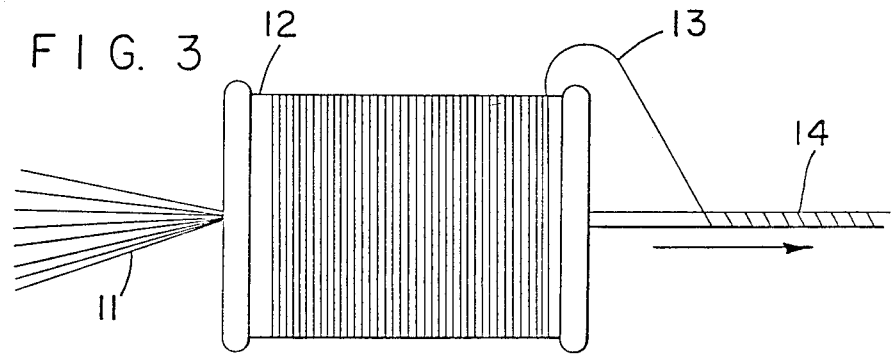
FIG. 3 is a schematic view of the spindle used to perform the process of the present invention.

Referring now to FIG. 3, a group of hollow fiber membranes 11 enter a rotating spindle 12, having a yarn or filament 13 wound thereon. The spindle rotates at about 3600 rpm and the hollow fiber membranes are pulled through the spindle at about 50 yards (45.7 m) per minute, so that the hollow fiber membranes are wrapped with about 2 turns per inch (79 turns per meter). The spinning speed and spindle speed can be varied to obtain a suitable number of turns per inch in the range of 0.5–6 turns per inch (19 to 236 turns per meter). The helically-wrapped bundle of hollow fiber membranes is shown leaving hollow spindle 12 at 14.

Two spindles in series that are rotating in opposite directions can be used to obtain a crosscross wrap around the bundle of hollow fiber membranes. The preferred method is a single helical wrap at about 1–2 turns per inch (39–78 turns per meter). A fine denier multifilament or monofilament yarn (20–150 denier) is used to wrap the hollow fiber membranes. Many types of fiber can be used for the wrapping material including but not limited to nylon, polyester, polyacrylonitrile and rayon. The preferred material are 40-70 denier nylon or polyester.

Generally, the bundles will contain from 5-300 hollow fiber membranes. The hollow fiber membranes generally are from 50-350 microns in diameter, with the diameter of the inside bore of the fiber being about half the outside diameter of the hollow fiber membrane.

In a preferred aspect of the invention, the bundles of hollow fiber membranes are helically wrapped while the hollow fiber membranes are still wet and then the hollow fiber membranes are dried. The hollow fiber membranes shrink in size on drying, and the wrap does not shrink, which results in a comparatively loosely wrapped bundle. An advantage of having a loose wrap is that the epoxy potting resin used to form the tube sheet is able to penetrate around the hollow fiber membranes during permeator forming. Yet, the wrap is snug enough to consolidate the hollow fiber membranes during bobbin winding and forming to prevent breaks and damage. Also, the low tension in the wet wrapping process permits wrapping the hollow fiber membranes during spinning without damaging the membrane skin.

The highest theoretical packing density that can be obtained with round cylinders is if they pack in a hexagonal pattern (cross-sectional view). From this, the highest theoretical packing density is about 90.7%. In typical modules using the bundles of the present invention a permeator packing density of 40 to 55% has been achieved. Generally, the individual bundles have a packing density of 15 to 45% when wrapped wet and a packing density of 10 to 30% after drying.

EXAMPLE

A yarn containing 24 aromatic polyamide hollow fiber membranes each about 250 microns outside diameter is fed through a hollow rotating spindle at a rate of 50 yards (48 m) per minute while the spindle is rotated at 3600 rpm to provide about 2 turns per inch (70 turns per meter). The wrapping material is a 70 denier multifilament nylon.

Four 12 inch (0.3 m) diameter modules are made essentially as described in U.S. Pat. Nos. 3,690,465 and 3,801,401, two of which contain hollow fiber membranes wet-wrapped as described above, and the other two of which contain hollow fiber membranes which have not been wrapped.

TABLE 1

| Module | $H_2/CH_4$ SF | Packing Factor (%) |
| --- | --- | --- |
| A | 56 | 34 |
| B | 71 | 31 |
| C | 203 | 41 |
| D | 191 | 43 |

Modules A and B were constructed from unwrapped hollow fiber membranes. Modules C and D were constructed from similar wet-wrapped hollow fiber membranes. As is reported in the Table 1, the modules using the wrapped hollow fiber membranes have better separation factors (SF) due to lack of fiber breakage and membrane damage. Also, the modules using the wrapped hollow fiber membranes have higher packing factors.

The testing reported in Table 1 was done at 90° C.

The hollow fiber membranes used in Modules A, B, C and D were each from 2 to 4 lots of fiber. The hollow fiber membranes tested in the various modules were similar but not identical. When tested in a lab scale mini-permeator at 90° C. the combined $H_2/CH_4$ separation factors of the fibers were as follows:

| Module | $H_2/CH_4$ SF |
| --- | --- |
| A | 131 |
| B | 135 |
| C | 134 |
| D | 98 |

The differences between the mini-permeator separation factors and the full scale separation factors reported for the hollow fiber separation membranes used in modules C and D are believed to be within experimental error due to the high separation factors involved and the accuracy of the measurements.

I claim:

1. A bundle of hollow fiber separation membranes having an outside diameter of from 50 to 350 microns which are continuously helically wrapped with a yarn at a rate of about 0.5-6 turns per inch which bundle has a packing density of 10 to 45 percent.

2. The bundle of claim 1 wherein the bundle is wet and has a packing density of 15 to 45%.

3. The bundle of claim 1 wherein the bundle is dry and has a packing density of 10 to 30%.

4. The bundle of claim 2 wherein there are from 5-300 hollow fiber separation membranes in the bundle.

5. The bundle of claim 3 wherein there are from 5-300 hollow fiber separation membranes in the bundle.

6. The bundle of claim 4 wherein the wrapping yarn is from 20-150 denier.

7. The bundle of claim 5 wherein the wrapping yarn is from 20-150 denier.

8. A permeator containing the hollow fiber separation membranes of claim 2.

9. A permeator containing the hollow fiber separation membranes of claim 3.

10. A process comprising extruding a plurality of hollow fibers from a spinning dope of a synthetic polymer, partially removing solvent from and quenching said hollow fibers to form hollow fiber separation membranes having an outside diameter of from 50 to 350 microns and continuously helically wrapping said hollow fiber separation membranes with a yarn at a rate of 0.5 to 6 turns per inch to form a bundle of hollow fiber separation membranes having a packing density of 15 to 45 percent.

11. The process of claim 10 wherein the hollow fiber separation membranes are further dried to provide a bundle having a packing density of 10 to 30 percent.

12. The process of claim 11 wherein there are from 5 to 300 hollow fiber separation membranes in the bundle.

13. The process of claim 12 wherein the wrapping yarn is from 20 to 150 denier.

14. A process comprising form in a bundle of 5-300 wet hollow fiber separation membranes, continuously helically wrapping said hollow fiber separation membranes with a yarn at a rate of 0.5 to 6 turns per inch to form a wrapped wet bundle of hollow fiber separation membranes having a packing density of 15 to 45 percent, drying the wrapped wet bundle of hollow fiber separation membranes to produce a wrapped dry bundle of hollow fiber separation membranes having a packing density of 10 to 30 percent, and forming the dry wrapped bundle of hollow fiber separation membranes into a gas separation permeator containing a plurality of dry wrapped hollow fiber separation membranes wherein the ends of the wrapped hollow fiber separation membranes are potted in a resin.

15. The process of claim 14 wherein the outside diameter of the hollow fiber separation membranes is from 50–300 microns.

16. The process of claim 15 wherein the wrapping yarn is from 20–150 denier.

* * * * *